(12) United States Patent
Huang et al.

(10) Patent No.: US 12,078,013 B1
(45) Date of Patent: Sep. 3, 2024

(54) ROLLING CURTAIN

(71) Applicant: Xiamen dosron intelligent technology Co., Ltd, Fujian (CN)

(72) Inventors: Junfeng Huang, Fujian (CN); Yuqing Chen, Fujian (CN); Hanqin Lin, Fujian (CN); Qiurong Zhang, Fujian (CN); Binfeng Yu, Fujian (CN); Asheng Zhang, Fujian (CN)

(73) Assignee: Xiamen dosron intelligent technology Co., Ltd, Xiamen (CN)

(*) Notice: Subject to any disclaimer, the term of this patent is extended or adjusted under 35 U.S.C. 154(b) by 0 days.

(21) Appl. No.: 18/429,526

(22) Filed: Feb. 1, 2024

(30) Foreign Application Priority Data

Feb. 21, 2023 (CN) .......................... 202310145766.8
Apr. 24, 2023 (CN) .......................... 202310450341.8

(51) Int. Cl.
*E06B 9/74* (2006.01)
*E06B 9/42* (2006.01)
*E06B 9/60* (2006.01)
*E06B 9/72* (2006.01)
*F16D 23/14* (2006.01)
*F16D 27/09* (2006.01)

(52) U.S. Cl.
CPC .................. *E06B 9/74* (2013.01); *E06B 9/42* (2013.01); *E06B 9/60* (2013.01); *E06B 9/72* (2013.01); *F16D 23/14* (2013.01); *F16D 27/09* (2013.01)

(58) Field of Classification Search
CPC ..... E06B 9/74; E06B 9/42; E06B 9/60; E06B 9/72; F16D 23/14; F16D 27/09
See application file for complete search history.

(56) References Cited

U.S. PATENT DOCUMENTS

| | | | |
|---|---|---|---|
| 11,891,856 B1* | 2/2024 | Lei ............................ | E06B 9/72 |
| 2007/0284053 A1* | 12/2007 | Mullet ...................... | E06B 9/86 |
| | | | 160/31 |
| 2014/0290870 A1* | 10/2014 | Colson ..................... | E06B 9/40 |
| | | | 160/10 |
| 2016/0201389 A1* | 7/2016 | Oakley ..................... | E06B 9/74 |
| | | | 160/368.1 |
| 2017/0204661 A1* | 7/2017 | Dann ....................... | E06B 9/322 |
| 2020/0308907 A1* | 10/2020 | Brondex ................... | E06B 9/50 |
| 2021/0032931 A1* | 2/2021 | Jang .......................... | E06B 9/72 |
| 2021/0079724 A1* | 3/2021 | Felteau ..................... | E06B 9/42 |

* cited by examiner

*Primary Examiner* — Beth A Stephan
(74) *Attorney, Agent, or Firm* — Cooper Legal Group, LLC (57) ABSTRACT

A rolling curtain includes a rolling tube, a curtain body, a first power component, and a second power component. The rolling tube has a first end and a second end opposite to the first end. The curtain body is wound around the rolling tube, the first power component is located at the first end of rolling tube, and the first power component has a motor and a transmission component, the transmission component is connected to the rolling tube and rotating with rolling tube. The second power component is located at the second end, and includes at least one power module connected to the rolling tube and rotating coaxially with the rolling tube, the power module includes a module chamber, a connecting rod, and at least one spring member, with an inner end of the spring member connected to the connecting rod and an outer end connected to the module chamber.

8 Claims, 10 Drawing Sheets

ROLLING CURTAIN

CROSS REFERENCE TO RELATED APPLICATION

This non-provisional patent application claims priority under 35 U. S. C. § 119 from Chinese Patent Application No. 2023101457668 filed on Feb. 21, 2023 and Chinese Patent Application No. 2023104503418 filed on Apr. 24, 2023, the entire content of which is incorporated herein by reference.

TECHNICAL FIELD

The disclosure relates to electric curtain technologies, in particular to a rolling curtain.

BACKGROUND

In today's society, curtains have been widely used in various places such as homes, offices, and public places. Main functions of the curtain are to regulate indoor lighting, protect privacy, and decorate indoor spaces. However, most of typical curtains are manual curtains, and it need mechanical structures such as drawstrings to operate the curtain and cause potential safety hazards, especially for lively and active children, who may pull the rope due to misoperation or curiosity, leading to dangers such as suffocation and cuts.

In addition, although there are also some electric curtains on the market, these curtains are usually driven by an electric motor to move the entire curtain. This design not only consumes a lot of power, but also requires a separate socket for use, which can generate additional noise during long-term use. Therefore, from the user's perspective, this electric curtain cannot fully meet people's needs.

In view of the above, in order to address the safety hazards of existing manual curtains and the high energy consumption and noise issues of electric curtains, we propose an improved curtain design scheme. This plan aims to provide a safe and energy-saving curtain, thereby improving the user experience and enhancing the quality of life.

SUMMARY

The disclosure aims to solve at least one of the technical problems in the above-mentioned technology to a certain extent. The purpose of the disclosure is to propose a rolling curtain that can extend the service life of the motor, reduce energy consumption, lower the cost of the curtain motor, and have a low failure rate.

The technical solution of the disclosure is implemented as follows:

A rolling curtain, comprising: a rolling tube, having a first end and a second end opposite to the first end; a curtain body wound around the rolling tube, a first power component located at the first end of the rolling tube, and the first power component having a motor and a transmission component, the transmission component connected to the rolling tube and rotating coaxially with the rolling tube; a second power component located at the second end, comprising at least one power module connected to the rolling tube and rotating coaxially with the rolling tube, the power module comprising a module chamber, a connecting rod, and at least one spring member, with an inner end of the spring member connected to the connecting rod and an outer end connected to the module chamber.

According to the disclosure, a rolling curtain is proposed, which uses a first power component and a second power component to cooperate to achieve the retraction and releasing of the curtain body. The first power component uses an electric motor to drive the rotation of the rolling tube to retract the curtain body, and the second power component uses a spring on the bracket to balance the torque generated by pulling the curtain body with the balance bar at the bottom of the curtain body and the curtain body, allowing the curtain body to stay at any height. By utilizing the second power component to provide partial power, the service life of the motor can be extended, energy consumption can be reduced, and the cost of the curtain motor can be lowered. For the first power component, it uses a clutch to switch between the motor and the transmission components for linkage and non linkage. By controlling the motor to operate or remain stationary, the curtain can be switched between electric and manual modes, with a simple structure and low failure rate.

In addition, according to the above-mentioned rolling curtain of the disclosure, it may also have the following additional technical features.

Furthermore, the first power component also has the clutch connected to the motor and the transmission component, and enables the motor and the transmission component to switch between linkage and non linkage states.

Furthermore, the clutch has a clutch pin shaft, a clutch sleeve, a first magnetic suction piece, a second magnetic suction piece, and a mounting seat, the clutch pin shaft is rotatably inserted on the mounting seat and has a first and second extension parts that extend out of the mounting seat, the first extension part is connected to the motor, and the second extension part is rotatably inserted into the clutch sleeve, one end of the clutch sleeve is connected to the transmission component, and the other end of the clutch sleeve is jointly defined with the mounting seat to form a containment chamber, a paddle is provided on the clutch pin shaft located in the containment chamber, and at least one slot is provided on the clutch sleeve located in the containment chamber, the first magnetic suction piece is placed in the containment chamber, and the second magnetic suction piece is set in the mounting seat.

Furthermore, a cone extends radially along an outer circumference of the clutch pin shaft to construct the paddle.

Furthermore, the second magnetic suction piece is wrapped around the outer circumference of the clutch pin shaft.

Furthermore, the first magnetic suction piece is a magnetic piece, and the second magnetic suction piece is an iron piece.

Furthermore, the first end is equipped with a counting device and a first tail plug, and the counting device is used to calculate the number of turns of the rolling tube.

Furthermore, the counting device comprises a magnetic counter comprising a magnetic marker, a magnetic detector, and a PCB control board, the magnetic marker is uniformly arranged on the first tail plug and rotates with the first tail plug, and the magnetic detector is installed on the PCB control board.

Furthermore, the second power component further comprises a second tail plug, a spring plug component comprising a second base, a cover plate, a key pin, and a spring, the spring is provided between the key pin and the second base, and a hollow column extends from the base, the key pin is slidably arranged within the hollow column and partially penetrates through the cover plate.

Furthermore, the second power component further includes a tactile adjustment component comprising a first knob, a second knob, and a third knob, the first knob and the second knob are matched via a slot, and the second knob and the third knob are connected by threads.

The rolling curtain implementing the disclosure has the following beneficial effects:

(1) The folding and retracting of the curtain body is achieved through the coordination of the first and second power components. The first power component uses a motor to drive the rotation of rolling tube to retract the curtain body, while the second power component uses a spring on the bracket to balance the torque generated by pulling the curtain body with the balance bar at the bottom of the curtain body and the curtain body, allowing the curtain body to stay at any height. Therefore, the second power component provides partial power, can extend the service life of motors and batteries, reduce energy consumption, and lower the cost of curtain motors.

(2) By setting the clutch, the electric and manual switching of the rolling tube can be achieved when the motor is started or stationary, making the curtains have the function of electric and manual switching; In addition, a magnetic counter is used to intelligently operate the curtains electrically, achieving one click opening and closing of the curtains, overload protection of the motor, and setting of any stopping position of the curtains.

DETAILED DESCRIPTION OF THE EMBODIMENTS

The following provides a detailed description of embodiments of the disclosure, examples of which are shown in the accompanying drawings, where identical or similar labels throughout represent identical or similar components or components with identical or similar functions. The embodiments described below with reference to the accompanying drawings are exemplary and intended to explain the disclosure, but cannot be understood as limitations to the disclosure.

In order to better understand the above technical solution, exemplary embodiments of the disclosure will be described in more detail below with reference to the accompanying drawings. Although exemplary embodiments of the disclosure are shown in the accompanying drawings, it should be understood that the disclosure can be implemented in various forms and should not be limited by the embodiments described herein. On the contrary, these embodiments are provided to enable a more thorough understanding of the disclosure and to fully convey the scope of the disclosure to those skilled in the art.

In order to better understand the above technical solution, the following will provide a detailed explanation of the above technical solution in conjunction with the accompanying drawings and specific implementation methods.

Referring to FIGS. 1-13, a rolling curtain is described according to an embodiment of the disclosure. The rolling curtain can be electrically retracted or manually pushed or pulled to keep the curtain at the desired height.

Figure 1:
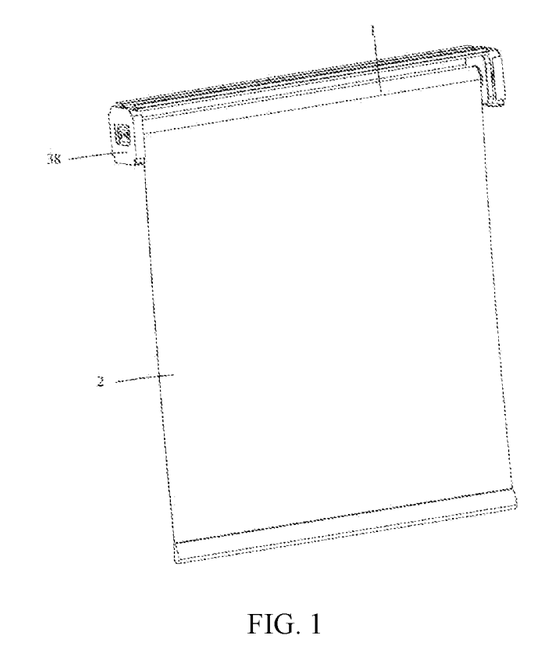
FIG. 1 is a schematic diagram of the structure of a rolling curtain according to an embodiment of the disclosure.
Figure 2:
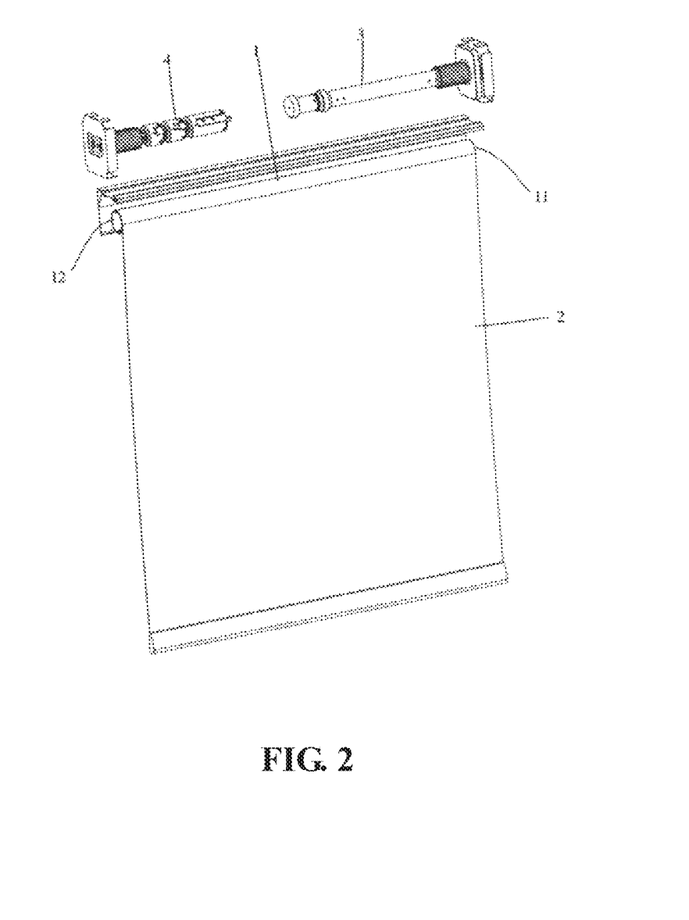
FIG. 2 is a schematic diagram of the decomposition of FIG. 1.
Figure 3:
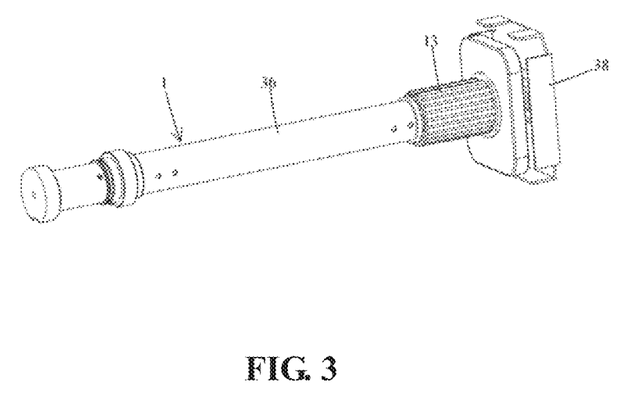
FIG. 3 is a schematic diagram of the structure of the first power component.

The roller blind curtain according to the embodiment of the disclosure includes a rolling tube 1, a curtain body 2, a first power component 3, and a second power component 4.

Specifically, the rolling tube 1 has a relative first end 11 and second end 12; the curtain body 2 is wound and installed on rolling tube 1. The first power component 3 is located at the first end of the rolling tube 1. The first power component 3 has a motor 31 and a transmission component 32, which is connected to the rolling tube 1 and can rotate coaxially with the rolling tube 1.

Figure 10:
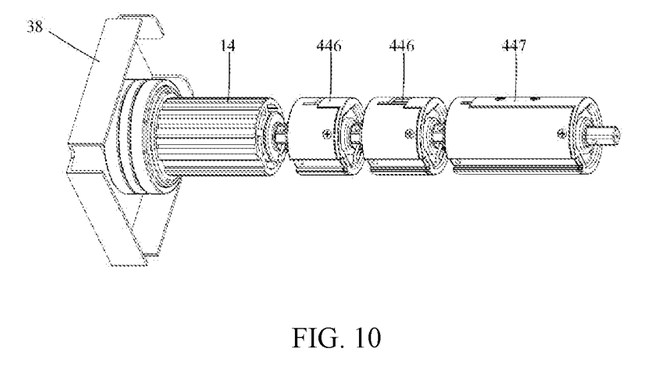
FIG. 10 is a schematic diagram of the structure of the second power component in FIG. 2.
Figure 11:
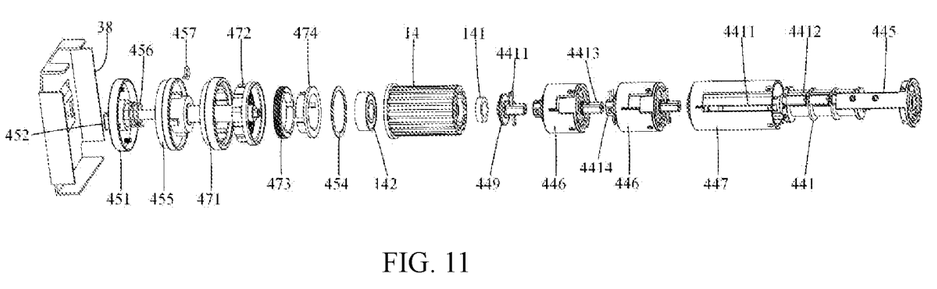
FIG. 11 is a schematic diagram of the decomposition of FIG. 10.

The second power component 4 is located at the second end 12 of the rolling tube, and comprises a power module 44. The power module 44 comprises a module chamber 443, a connecting rod 441, and a spring 442. The inner end of the spring 442 is connected to a connecting rod 441, and the outer end is connected to the module chamber 443. The torque generated by the spring 442 is used to counteract the gravity of the curtain body 2 at different height positions, thereby allowing the curtain body 2 to stay at any height.

That is to say, for the first power component 3, the rotation of the motor 31 drives the rolling tube 1 to rotate, causing the curtain body 2 to be electrically retracted and placed in the rolling tube 1. For the second power component 4, when manually pushing and pulling the curtain body 2, the rolling tube 1 rotates, causing the spring 442 to generate a torque that balances with the balance bar at the bottom of the curtain body 2, allowing the curtain body 2 to stay at the desired height. In addition, by setting the clutch 33 in the first power component 3, the electric and manual operation of the rolling tube 1 can be switched when the motor 31 starts or stops.

Therefore, according to the disclosure, a rolling curtain is proposed, which uses a first power component 3 and a second power component 4 to cooperate to achieve the retraction and releasing of the curtain body 2. The first power component 3 uses an electric motor 31 to drive the rotation of the rolling tube 1 to retract and retract the curtain body 2, and the second power component 4 uses a spring 442 on the connecting rod 441 to balance the torque generated by pulling the curtain body 2 with the balance bar at the bottom of the curtain body 2 and the curtain body 2, allowing the curtain body 2 to stay at any height. Therefore, by utilizing the second power component 4 to provide partial power, the service life of motor 31 can be extended, energy consumption can be reduced, and the cost of curtain motor can be lowered.

For the first power component 3, combined with FIGS. 3-9, the first power component 3 further includes a clutch 33, which is connected to the motor 31 and the transmission component 32, and is suitable for switching between linkage and non linkage of the two. The clutch 33 includes a clutch pin shaft 331, a clutch sleeve 332, a first magnetic suction piece 333, a second magnetic suction piece 334, and a mounting seat 335. The clutch pin shaft 331 is rotatably inserted into the mounting seat 335 and has a first and second extension parts that extend out of the mounting seat 335. The first extension part is connected to the motor 31, and the second extension part is rotatably inserted into the clutch sleeve 332. One end of the clutch sleeve 332 is connected to the transmission component 32, and the other end is jointly limited with the mounting seat 335 to provide an accommodating chamber 34. The clutch pin shaft 331 located in the accommodating chamber 34 is equipped with a paddle 3311, and the clutch sleeve 332 located in the accommodating chamber 34 is equipped with three first card slots 3321. The first magnetic suction piece 333 is placed in the accommodating chamber 34, and the second magnetic suction piece 334 is placed in the mounting seat 335. When motor 31 is running, the paddle 3311 moves the first magnetic suction piece 333 into the first card slot 3321. The first magnetic suction piece 333 limits the position of the paddle 3311 to drive the clutch pin shaft 331 to rotate the clutch sleeve 332 and the transmission component 32, causing the rolling tube 1 to electrically retract and release the curtain body 2. When the motor 31 is stationary, the second magnetic suction piece 334 adsorbs the first magnetic suction piece 333 away from the first card slot 3321, and the rolling tube 1 is suitable for manually retracting and releasing the curtain body 2.

Figure 5:
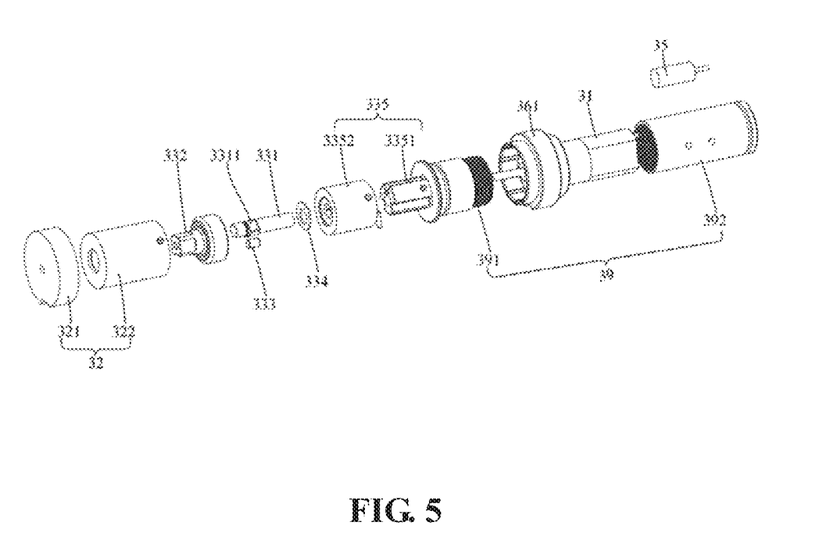
FIG. 5 is an enlarged schematic diagram of the local components in FIG. 4, mainly showing the structure of the clutch.
Figure 6:
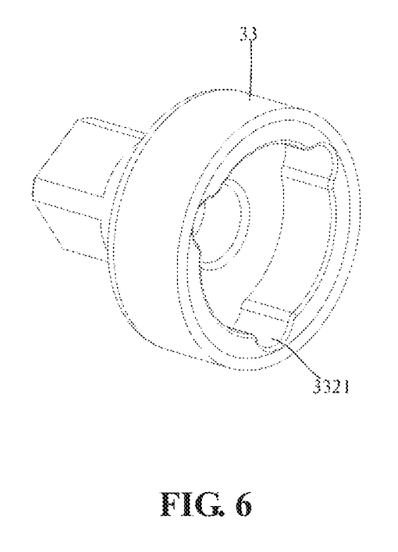
FIG. 6 shows the structure of the clutch sleeve in FIG. 5.

In other words, connecting the rolling tube 1 through the transmission component 32 and being able to rotate coaxially with the rolling tube 1 can provide power transmission for the retraction and releasing of the curtain body 2. The first extension part of the clutch pin shaft 331 is connected to the motor 31, and the second extension part can be rotatably inserted into the clutch sleeve 332. One end of the clutch sleeve 332 is connected to the transmission component 32, and the other end, together with the mounting seat 335, defines the accommodating chamber 34. The clutch pin shaft 331 located inside the accommodating chamber 34 is equipped with a paddle 3311, so that the motor 31 can drive the paddle 3311 to rotate inside the accommodating chamber 34. By having a first card slot 3321 on the clutch sleeve 332 located in the accommodating chamber 34, a first magnetic suction piece 333 is placed in the accommodating chamber 34, and a second magnetic suction piece 334 is set in the adjacent mounting seat 335, the paddle 3311 moves the first magnetic suction piece 333 into the first card slot 3321 when the motor 31 is running. The first magnetic suction piece 333 limits the position of the paddle 3311 to drive the clutch pin shaft 331 to rotate the clutch sleeve 332 and the transmission component 32, causing the rolling tube 1 to electrically retract the curtain body 2. When motor 31 is stationary, the second magnetic suction piece 334 adsorbs the first magnetic suction piece 333 away from the first card slot 3321, so that switching to manual pulling of the curtain body 2 will not drive the motor 31 to rotate. By setting the clutch 33 in the first power component 3, it is possible to switch between electric and manual operation of the rolling tube 1 when the motor 31 starts or stops. By using the clutch 33 to switch the linkage and non linkage between the motor 31 and the transmission component 32, the curtain can be switched between electric and manual modes by controlling the motor 31 to operate or remain stationary. The structure is simple and the failure rate is low.

Therefore, by utilizing the combination of the first magnetic suction piece 333 and the second magnetic suction piece 334 of clutch 33, when the motor 31 rotates, the paddle 3311 on the clutch pin shaft 331 pulls the first magnetic suction piece 333 into the first card slot 3321, so that the clutch pin shaft 331 can drive the clutch sleeve 332 and the transmission component 32 to rotate, thereby driving rolling tube 1 to rotate. When the motor 31 is stationary, the second magnetic suction piece 334 adsorbs the first magnetic suction piece 333 out of the first card slot 3321, achieving the clutch effect. Thus, by manually pulling the balance bar 23, the curtain body 2 can be retracted and released without driving the motor 31 to rotate. The power component structure of this roller blind curtain is simple, with a low failure rate, and can achieve switching between electric and manual curtains.

Figure 4:
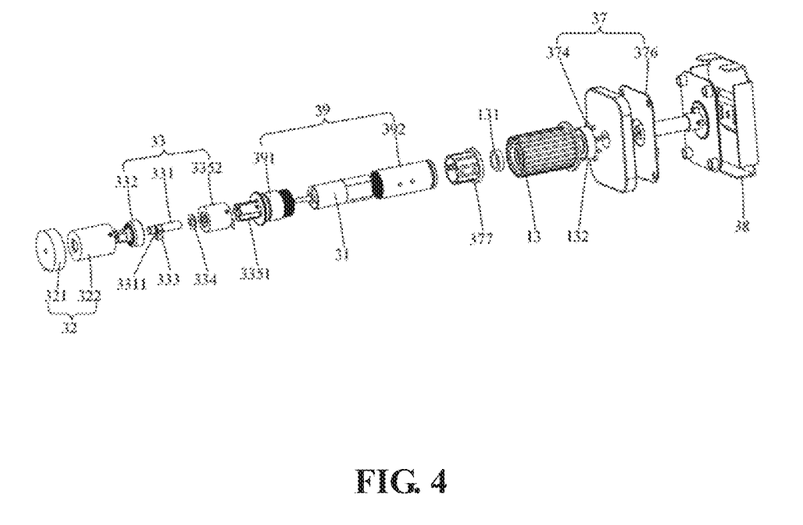
FIG. 4 is an exploded schematic diagram of FIG. 3, with the casing omitted.

For transmission component 32, it is connected to the rolling tube 1 and can rotate coaxially with the rolling tube 1. Specifically, the transmission component 32 includes a card seat 321 and an outer sleeve 322. The outer sleeve 322 is set on the clutch sleeve 332, which is connected to the card seat 321 and the card seat 321 is connected to rolling tube 1 buckle. Therefore, during electric operation, the clutch 33 drives the transmission component 32 to be connected (linked) with the motor 31, causing the motor 31 to drive the card seat 321 to rotate and drive the curtain body 2 on rolling tube 1 to retract. During manual operation, the clutch 33 disconnects the transmission connection between the transmission component 32 and the motor 31 (without linkage), so that the card seat 321 rotates with rolling tube 1 and does not link to the motor 31 when rolling tube 1 rotates. Among them, the connection between the clutch sleeve 332 and the card seat 321 can be that an extension of the clutch sleeve 332 is embedded in the groove of the card seat 321. The coordination between card seat 321 and rolling tube 1 can be achieved by setting grooves on card seat 321, and the inner wall of rolling tube 1 is raised to connect card seat 321 with the buckle of rolling tube 1. The entire power component is hidden inside rolling tube 1, making the curtains aesthetically pleasing.

For the clutch pin shaft 331, there is a paddle 3311 located near the second extension of the clutch pin shaft 331. Therefore, the rotation of the motor 31 can drive the paddle 3311 to rotate. The paddle 3311 pulls the first magnetic suction piece 333 into the first card slot 3321 of the clutch sleeve 332. After the first magnetic suction piece 333 enters the first card slot 3321, it can restrict the paddle 3311 from rotating in the accommodating chamber 34, which can drive the clutch sleeve 332 to rotate. The clutch sleeve 332 then drives the card seat 321 to rotate. Turning the card seat 321 drives the rolling tube 1 to rotate, thereby electrically retracting and releasing the curtain body 2.

Furthermore, the paddle 3311 can be constructed by a cone extending radially from the outer circumference of the clutch pin shaft 331. The cone-shaped paddle 3311 can gradually detach the first magnetic suction piece 333 from the magnetic attachment of the second magnetic suction piece 334 and enter the first card slot 3321 when the clutch pin shaft 331 rotates. Among them, the cone-shaped paddle 3311 can be in the shape of a pyramid, and the side of the pyramid can gradually detach the first magnetic suction piece 333 from the magnetic adsorption of the second magnetic suction piece 334.

For the clutch sleeve 332, one end of the clutch sleeve 332 is connected to the transmission component 32, and the other end is jointly limited with the mounting seat 335 to form an accommodating chamber 34. The other end of the clutch sleeve 332 and the mounting seat 335 jointly limit the accommodating chamber 34, which can limit the paddle 3311 on the clutch pin shaft 331 to rotate inside the accommodating chamber 34, and limit the first magnetic suction piece 333 to be inside the accommodating chamber 34. The clutch sleeve 332 inside the accommodating chamber 34 is equipped with a first card slot 3321. When the motor 31 is running, the paddle 3311 moves the first magnetic suction piece 333 into the first card slot 3321. The first magnetic suction piece 333 limits the paddle 3311 to drive the clutch pin shaft 331 to rotate the clutch sleeve 332 and the transmission component 32, causing rolling tube 1 to electrically retract and release the curtain body 2. It can be understood that the clutch sleeve 332 has a concave cavity at one end facing the mounting seat 335, which cooperates with the mounting seat 335 to form an accommodating chamber 34. The first card slot 3321 is set on the inner wall of the accommodating chamber 34. When the first magnetic suction piece 333 is moved into the first card slot 3321, the top of the cone-shaped paddle 3311 is located in the card slot formed between the first magnetic suction piece 333 and the inner wall of the accommodating chamber 34. The first card slot 3321 restricts the movement of the first magnetic suction piece 333, the first magnetic suction piece 333 restricts the rotation of the paddle 3311, causing the paddle to drive the clutch sleeve 332 to rotate as a whole.

For the first magnetic suction piece 333, the first magnetic suction piece 333 is placed in the accommodating chamber 34. The first magnetic suction piece 333 is moved into the first card slot 3321 on the clutch sleeve 332 by rotating the paddle 3311. The first magnetic suction piece 333 limits the paddle 3311 to drive the clutch sleeve 332 and the transmission component 32 to rotate, causing the rolling tube 1 to electrically retract and release the curtain body 2. When the motor 31 is stationary, the paddle 3311 is misaligned with the first magnetic suction piece 333. Due to the magnetic attraction between the second magnetic suction piece 334 and the first magnetic suction piece 333, the first magnetic suction piece is reset. Therefore, when the rolling tube 1 drives the transmission component 32 and the clutch sleeve 332 to rotate, the clutch sleeve 332 will not drive the clutch pin shaft 331 to rotate. Among them, the first magnetic suction piece 333 can be a magnetic piece, the first magnetic suction piece 333 can be a cylindrical magnet, and the cylindrical magnet is directly placed in the accommodating chamber 34.

For the second magnetic suction piece 334, the second magnetic suction piece 334 surrounds the outer circumference of the clutch pin shaft 331. When the motor 31 is stationary, the second magnetic suction piece 334 can reset the first magnetic suction piece 333. Specifically, the second magnetic suction piece 334 can be an iron ring, which is sleeved on the clutch pin shaft 331. The outer diameter of the iron ring can be set to be slightly larger than the diameter of the clutch pin shaft 331, and there is still a distance between the outer edge of the iron ring and the inner wall of the accommodating chamber 34. When the motor 31 stops rotating, the inner sleeve 3352 can adsorb the first magnetic suction piece 333 on the first card slot 3321 through magnetic coupling between the second magnetic suction piece 334 and the first magnetic suction piece 333, so that the paddle 3311 and the clutch sleeve 332 are in a disengaged state.

Figure 9:
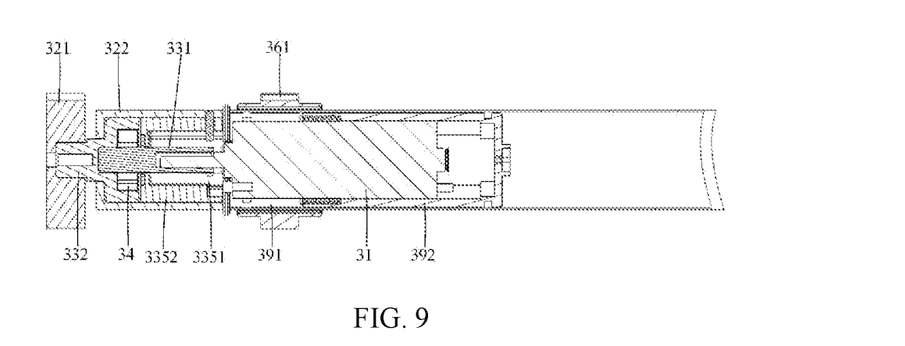
FIG. 9 is an enlarged schematic diagram of the local construction in FIG. 8.

For the mounting seat 335, the mounting seat 335 includes a fixed seat 3351 and an inner sleeve 3352. The outer end face of the inner sleeve 3352 and the clutch sleeve 332 jointly define an accommodating chamber 34. One end of the fixed seat 3351 is provided with a convex column, which is inserted into the inner sleeve 3352 to abut the second magnetic suction piece 334 against the inner end face of the inner sleeve 3352. The outer end face of the inner sleeve 3352 and the clutch sleeve jointly define the accommodating chamber 34, so that the first magnetic suction piece 333 and the paddle 3311 of the clutch pin shaft 331 are limited to move within the accommodating chamber 34. The convex column is inserted into the inner sleeve 3352 to abut the second magnetic suction piece 334 against the inner end face of the inner sleeve 3352, so that the second magnetic suction piece 334 is limited to the inner end face of the inner sleeve 3352, facilitating the assembly of the second magnetic suction piece 334. In addition, the assembly of the fixed seat 3351 and the inner sleeve 3352 can be a matching structure of pins and holes.

For motor 31, the power output shaft of the motor 31 is connected to the clutch pin shaft 331. Specifically, a channel is provided along the axial direction on the clutch pin shaft 331, and the power output shaft of the motor 31 is inserted into the channel.

Figure 8:
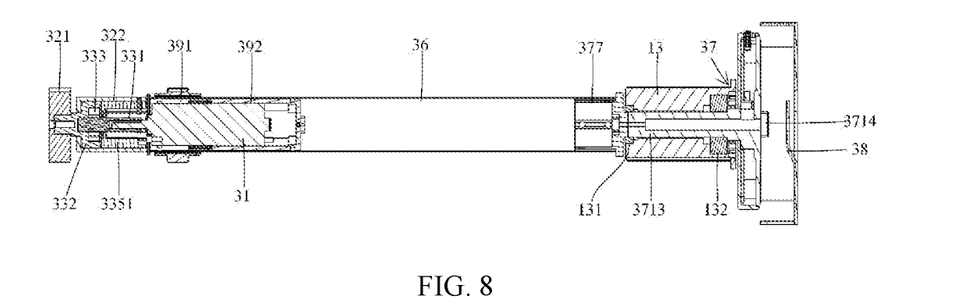
FIG. 8 is a sectional view of FIG. 3.

In addition, the first power component 3 may also include a battery pack 35 and a support tube 36. The internal part of the support tube 36 is equipped with an installation tube 39, which includes a first installation tube 391 and a second installation tube 392, and the two are connected by threads, wherein the first installation tube 391 is integrally connected to the fixed seat 3351. The battery pack 35 is installed inside the installation tube 39 and connected to the motor 31. The battery pack 35 can provide power to the motor 31.

In other examples, the first power component 3 may also include a counting device 37, a first tail plug, and an end cover 38. One end of the support tube 36 is connected to the mounting seat 335, and the other end is connected to the first connecting pin 377. One end of the support tube 36 is connected to the mounting seat 335 to reinforce and support the entire power component of the rolling curtain. At the same time, the motor 31 and the battery pack 35 are set inside the installation tube 39. The outer side of the support tube 36 is also equipped with a sleeve 361. The sleeve 361 is connected to the rolling tube using a sleeve, making the installation of the support tube 36 and the rolling tube 1 convenient and more aesthetically pleasing.

Figure 7:
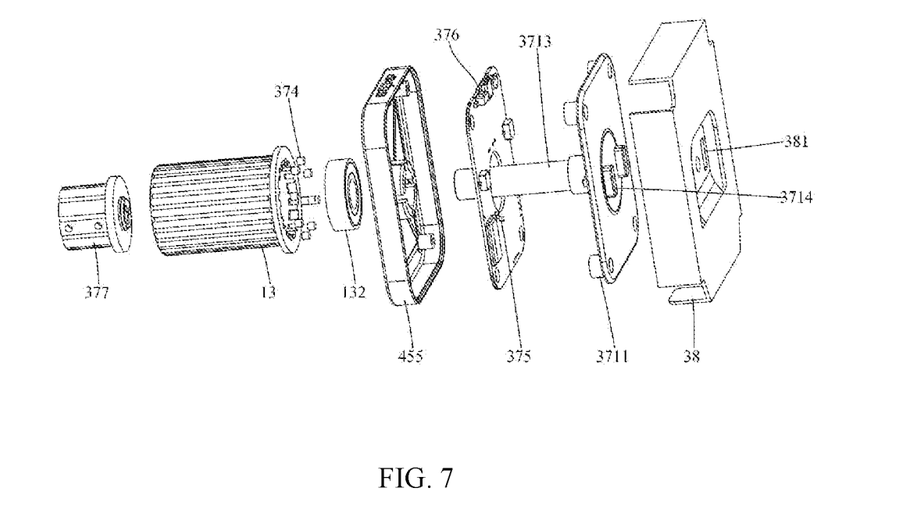
FIG. 7 is an enlarged schematic diagram of the local components in FIG. 4, mainly showing the structure of the magnetic counter device.

For the counting device 37, a magnetic counter 37 is used. The magnetic counter 37 includes a magnetic marker 374, a magnetic detector 375, and a PCB control board 376. The magnetic marker 374 consists of several magnetic cylinders, and a circular array is arranged in a groove on the end face of the first tail plug 13, which rotates with the first tail plug 13. The magnetic detector 375 is installed on the PCB control board 376, for detecting the magnetic field changes of magnetic marker 374 through magnetic detector 375 to detect the number of forward and reverse rotations of the rolling tube. The structural design is reasonable, space saving, and can accurately control the rotation of motor 31 to control the position of curtain body 2. In addition, the PCB control board 376 can control the output torque and rotation direction of motor 31 to achieve up and down movement of curtain body 2, adjustable speed, and adjustable highest and lowest points. The PCB control board 376 adopts existing editable control technology and will not be elaborated here. Therefore, through the setting of the magnetic counter 37, it is possible to intelligently operate the curtains electrically, achieving one click opening and one click closing of the curtains, overload protection of the motor, and setting of any stopping position of the curtains.

For the PCB control board, it is installed inside the PCB control box, which includes a first cover plate and a first base. The first cover plate includes a fixing pin and a first protrusion. The fixing pin runs through the PCB control board and the first base and is inserted into the first tail plug. The first protrusion can match the through-hole on the end cover, allowing the first end to be fixed on the end cover.

For the first tail plug 13, the first tail plug 13 can be rotatably set on the fixed pin 3713, and the two ends of the first tail plug 13 are respectively equipped with a first bearing 131 and a second bearing 132. The fixed pin 3713 and the first connecting pin 377 contact at the first bearing 131, and their contact surfaces are both equipped with through holes, which can be connected to the two through a pin shaft.

Combining FIGS. 10 and 11, for power module 44, it further includes module chamber 443 and module end cover 445. The side wall of module chamber 443 is equipped with an opening groove 4431, and the middle of connecting rod 441 is equipped with an annular groove 4412. The inner end of spring 442 is connected to the annular groove 4412, and the outer end is fixed to the side wall of module chamber 443 through module end cover 445. Among them, the specifications and quantities of several power modules 44 can be determined according to the weight requirements of curtain body 2.

The power module consists of two first power modules 446 and one second power module 447. The first power module 446 is equipped with a spring 442, while the second power module 447 is equipped with three springs 442. The power modules are connected to each other through connecting rod 441, which is locked by a cotter pin 4411. With multiple specifications of power modules, it can achieve a multi-level tension adjustment within a range, effectively reducing costs and adapting to the installation of curtains of various sizes.

Figure 14:
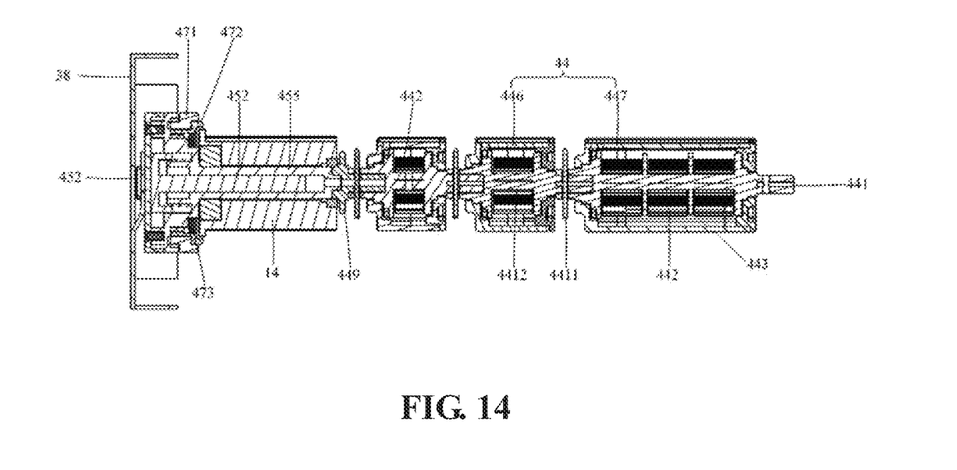
FIG. 14 is a sectional view of FIG. 10.

The second end 12 is further equipped with a spring plug component 45 and a second tail plug 14. The spring plug component 45 includes a second base 455, a second cover plate 451, a key pin 452, and a spring 456. A spring 456 is located between one side of the key pin 452 and the second base 455, and a second protrusion is located on the other side that protrudes from the second cover plate 451. The length of the second power component 4 can be shortened by pressing the key pin 452, thereby locking the key pin 452 into the end cover 38. Among them, the second base 455 comprises a hollow column that passes through the second tail plug 14. The key pin 452 is slidably arranged inside the hollow column, and the two ends of the second tail plug 14 are respectively equipped with a third bearing 141 and a fourth bearing 142, so that the second tail plug 14 can be rotatably arranged on the hollow column of the second base 455.

Regarding the end cover 38, there is a through hole 381 on the end cover 38 that matches the second protrusion of the key pin 452. After the first power component and the second power component 4 are sequentially inserted into the end cover, the protrusion of the key pin 452 pops up under the action of the spring 456, and then it is inserted into the through hole, greatly reducing the difficulty of installation.

Figure 13:
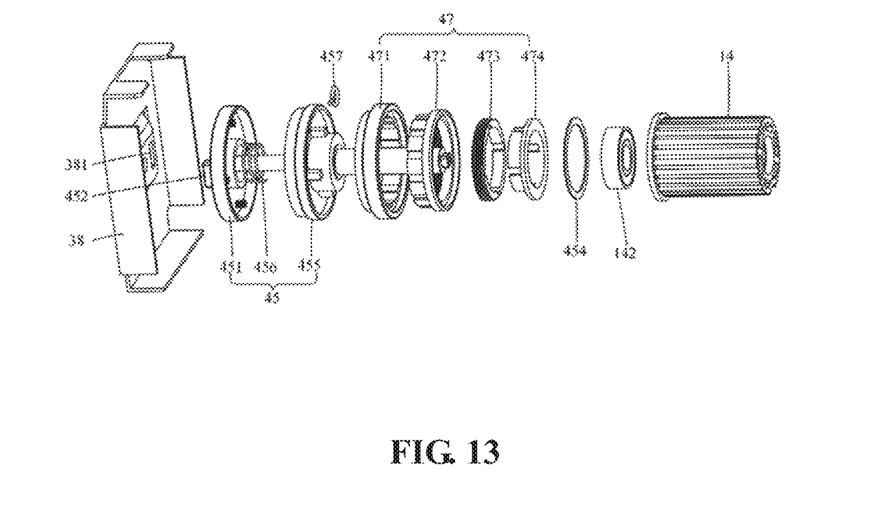
FIG. 13 is an enlarged schematic diagram of the local components in FIG. 11, mainly showing the friction plate structure and elastic locking buckle structure.

The second power component 4 also includes a tactile adjustment component 47, which is set between the spring plug component and the second tail plug 14. The tactile adjustment component 47 includes a first knob 471, a second knob 472, and a third knob 473. The first knob 471 and the second knob 472 can be matched through a slot, and the second knob 472 and the third knob 473 are connected through threads. The first knob 471 can drive the second knob 472 to rotate. The third knob 473 is pushed forward by the thread, which in turn drives the adjusting element 474 to contact the friction plate 454 on the second tail plug 14, thereby increasing the friction force. Even if there is a slight difference between the counterweight of the curtain body 2 and the power module 44, the touch can be fine tuned by adjusting the contact area between the adjusting element 474 and the friction plate 454, ensuring that the curtain can stay at any position without the need to pull the curtain with a rope.

For the second base 455, there is a locking element 457 on the side wall of the second base 455. The locking element 457 is threaded to the second base 455 and conflicts with the side wall of the first knob 471. The adjustment switch of the first knob 471 can be controlled to ensure that the equipment does not undergo unexpected changes or looseness under specific conditions, ensuring the stable working state of the equipment.

Figure 12:
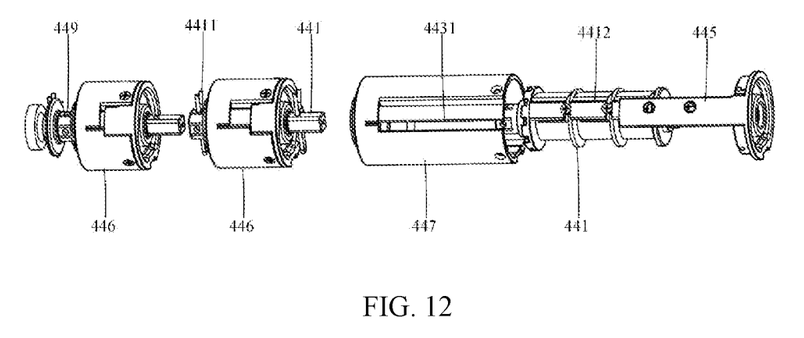
FIG. 12 is an enlarged schematic diagram of the local components in FIG. 11, mainly showing the structure of the spring member.

For connecting rod 441, there are insertion ends 4413 and reception ends 4414 at both ends of the connecting rod 441, which are mutually matched. The insertion end 4413 of each connecting rod 441 can be inserted into the reception end 4414 of another connecting rod 441. The insertion end 4413 and reception end 4414 are fixed through a cotter pin 4411, so that various power modules can be quickly assembled and connected.

Furthermore, the connecting rod 441 is connected to the hollow column of the second base 455 through a second connecting pin 449. The second connecting pin 449 is connected to both the connecting rod and the second base 455 through a pin, which means that the end face of the hollow column of the second base 455 is provided with a square convex part, and the second connecting pin 449 is provided with a groove that matches the square convex part. The inner end of spring 442 is connected to connecting rod 441, and the outer end of spring 442 is connected to the side wall of module chamber 443 and locked by module end cover 445. At the same time, there are several annular grooves 4412 uniformly arranged on the connecting rod 441, so that several springs 442 can be spaced along the direction of the connecting rod 441 to work together. When the push-pull curtain body 2 drives the rolling tube 1 to rotate, the spring 442 generates torque. The torque is balanced with the balance bar at the bottom of the curtain body 2 and the curtain body 2, allowing the curtain body 2 to stay at any height with a slight push and pull.

For the connection between the power module 44 and the rolling tube 1, a sleeve is used, which means that there is a protrusion inside the rolling tube 1, and the power module 44 has a groove. The protrusion and groove are matched to set the second power component 4 at the second end 12 of the rolling tube 1. Similarly, the connection between the first and second tail plugs and the rolling tube 1 is also connected using a sleeve. As a result, when pulling the curtain body 2, the rolling tube 1 rotates, causing the power module 44 to rotate, thereby generating torque from the spring 442.

Therefore, the power module 44 can be used as a power component to drive the positioning of the curtain body 2 after movement, which can share the pressure of the motor 31, extend the service life of the motor 31, reduce energy consumption, and lower costs.

In order to better understand this embodiment and further elaborate on the workflow of this embodiment, in the electric state, when the motor 31 rotates, it can drive the paddle 3311 on the clutch pin shaft 331 to rotate, thereby moving the first magnetic suction piece 333. When the first magnetic suction piece 333 moves into the first card slot 3321 in the clutch sleeve 332, the first magnetic suction piece 333 limits the position of the paddle 3311 to drive the clutch pin shaft 331 to rotate the clutch sleeve 332 and the transmission component 32, causing the rolling tube 1 to electrically retract and release the curtain body 2. When the motor 31 is stationary, the second magnetic suction piece 334 adsorbs the first magnetic suction piece 333 away from the first card slot 3321, achieving the clutch effect and switching it from the electric state to the manual state. In the manual state, due to the setting of the second power component 4, when manually pulling the balance bar at the bottom of curtain body 2 at different heights, the spring 442 generates different torques, causing the curtain body 2 to stay at any height. Among them, the spring 442 cooperates with the counterweight of the curtain body 2 and the balance bar. The more curtain body 2 is pulled down, the greater the torque of the spring 442. When the curtain body 2 rises, the opposite is true.

In the description of the disclosure, it should be understood that the terms "center", "vertical", "horizontal", "length", "width", "thickness", "top", "bottom", "front", "back", "left", "right", "vertical", "horizontal", "top", "bottom", "inside", "outside", "clockwise" The orientation or position relationship indicated by "counterclockwise" is based on the orientation or position relationship shown in the drawings, and is only for the convenience of describing the disclosure and simplifying the description, rather than indicating or implying that the device or element referred to must have a specific orientation, be constructed and operated in a specific orientation, and therefore cannot be understood as a limitation of the disclosure.

In addition, the terms "first" and "second" are only used to describe the purpose and cannot be understood as indicating or implying relative importance or implying the quantity of technical features indicated. Therefore, the features limited to "first" and "second" can explicitly or implicitly include one or more of these features. In the description of the disclosure, "multiple" means two or more, unless otherwise specified.

In the disclosure, unless otherwise specified and limited, the terms "installation", "connection", "connection", "fixation" and other terms should be broadly understood, for example, they can be fixed connections, detachable connections, or integrated; It can be a mechanical connection or an electrical connection; It can be directly connected or indirectly connected through an intermediate medium, which can be the internal connection of two components or the interaction relationship between two components. For ordinary technical personnel in this field, the specific meanings of the above terms in the disclosure can be understood based on specific circumstances.

In the disclosure, unless otherwise explicitly defined and limited, the first feature may include direct contact between the first and second features, or direct contact between the first and second features through other features between them, either above or below the second feature. Moreover, the first feature "above", "above", and "above" in the second feature include the first feature directly above and diagonally above the second feature, or simply indicating that the first feature is horizontally higher than the second feature. The first features "below", "below", and "below" include the first feature directly below and diagonally below the second feature, or simply indicate that the horizontal height of the first feature is less than that of the second feature.

In the description of this specification, reference to terms such as "one embodiment", "some embodiments", "examples", "specific examples", or "some examples" means that the specific features, structures, materials, or features described in conjunction with the embodiments or examples are included in at least one embodiment or example of the disclosure. In this manual, the illustrative expressions of the above terms should not be understood as necessarily referring to the same embodiments or examples. Moreover, the specific features, structures, materials, or features described can be combined in an appropriate manner in any one or more embodiments or examples. In addition, technical personnel in this field can combine and combine different embodiments or examples described in this specification.

Although embodiments of the disclosure have been shown and described above, it can be understood that the above embodiments are exemplary and cannot be understood as a limitation of the disclosure. Ordinary technical personnel in the art may make changes, modifications, substitutions, and variations to the above embodiments within the scope of the disclosure.

The invention claimed is:

1. A rolling curtain, comprising:
a rolling tube, having a first end and a second end opposite to the first end;
a curtain body wound around the rolling tube;
a first power component located at the first end of the rolling tube, and the first power component having a motor and a transmission component, the transmission component connected to the rolling tube and rotating coaxially with the rolling tube; and
a second power component located at the second end, the second power component comprising at least one power module connected to the rolling tube and rotating coaxially with the rolling tube, the at least one power module comprising a module chamber, a connecting rod, and at least one spring member, with an inner end of the at least one spring member connected to the connecting rod and an outer end of the at least one spring member connected to the module chamber;
wherein the first power component also has a clutch connected to the motor and the transmission component, and the clutch enables the motor and the transmission component to switch between a linkage state and a non linkage state;
wherein the clutch has a clutch pin shaft, a clutch sleeve, a first magnetic suction piece, a second magnetic suction piece, and a mounting seat, the clutch pin shaft is rotatably inserted on the mounting seat and has a first extension part and a second extension part that extend out of the mounting seat, the first extension part is connected to the motor, the second extension part is rotatably inserted into the clutch sleeve, one end of the clutch sleeve is connected to the transmission component, a second end of the clutch sleeve is jointly defined with the mounting seat to form a containment chamber, a paddle is provided on the clutch pin shaft located in the containment chamber, at least one slot is provided on the clutch sleeve located in the containment chamber, the first magnetic suction piece is placed in the containment chamber, and the second magnetic suction piece is set in the mounting seat.

2. The rolling curtain according to claim 1, wherein the second power component further comprises a second tail plug, a spring plug component comprising a second base, a cover plate, a key pin, and a spring, the spring is provided between the key pin and the second base, a hollow column extends from the base, and the key pin is slidably arranged within the hollow column and partially penetrates through the cover plate.

3. The rolling curtain according to claim 1, wherein the second power component further comprises a tactile adjustment component comprising a first knob, a second knob, and a third knob, the first knob and the second knob are matched via a slot, and the second knob and the third knob are connected by threads.

4. The rolling curtain according to claim 1, wherein a cone extends radially along an outer circumference of the clutch pin shaft to construct the paddle.

5. The rolling curtain according to claim 1, wherein the second magnetic suction piece is wrapped around an outer circumference of the clutch pin shaft.

6. The rolling curtain according to claim 1, wherein the first magnetic suction piece is a magnetic piece, and the second magnetic suction piece is an iron piece.

7. The rolling curtain according to claim 1, wherein the first end is equipped with a counting device and a first tail plug, and the counting device is used to calculate a number of turns of the rolling tube.

8. The rolling curtain according to claim 7, wherein the counting device comprises a magnetic counter comprising a magnetic marker, a magnetic detector, and a printed control board (PCB), the magnetic marker is uniformly arranged on the first tail plug and rotates with the first tail plug, and the magnetic detector is installed on the PCB.

* * * * *